United States Patent
Dennard et al.

(10) Patent No.: US 9,986,393 B2
(45) Date of Patent: May 29, 2018

(54) SYSTEM AND METHOD OF CREATING AND PROVIDING SMS HTTP TAGGING

(71) Applicant: INTERNATIONAL BUSINESS MACHINES CORPORATION, Armonk, NY (US)

(72) Inventors: Mark D. Dennard, Decatur, GA (US); John R. Dingler, Dallas, GA (US); Eythan C. Holladay, Marietta, GA (US); Jessica E. Marceau, Duluth, GA (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/414,684

(22) Filed: Jan. 25, 2017

(65) Prior Publication Data
US 2017/0134917 A1 May 11, 2017

Related U.S. Application Data

(63) Continuation of application No. 14/929,987, filed on Nov. 2, 2015, which is a continuation of application
(Continued)

(51) Int. Cl.
*H04L 29/08* (2006.01)
*H04M 1/725* (2006.01)
(Continued)

(52) U.S. Cl.
CPC .............. *H04W 4/14* (2013.01); *H04L 67/02* (2013.01); *H04M 1/72522* (2013.01); *H04M 3/42382* (2013.01); *H04W 4/20* (2013.01)

(58) Field of Classification Search
CPC ..... H04W 4/14; H04L 67/02; H04M 1/72522; H04M 3/42382
See application file for complete search history.

(56) References Cited

U.S. PATENT DOCUMENTS 5,020,121 A * 5/1991 Rosenberg ............... G09G 5/28
358/1.9
5,912,954 A 6/1999 Whited et al.
(Continued)

OTHER PUBLICATIONS

"Enabling SMS in SS7 Telephony Applications Using Intel Netstructure SS7 Boards and Signaling Gateways", pp. 1-13, Intel in Communications, Application Note.

*Primary Examiner* — Qun Shen
(74) *Attorney, Agent, or Firm* — John Pivnichny; Andrew M. Calderon; Roberts Mlotkowski Safran, Cole & Calderon, P.C.

(57) ABSTRACT

A system and method for sending text messages and, more particularly, a system and method for forcing SMS capable devices to communicate via SMS using, for example, SS7 protocol. A method includes providing a tag forcing a return text message to be sent via SS7 protocol. In use, the system and method is configured to force the use of SMS messages via the SS7 protocol. The system and method can be implemented over any network, for example, and any existing mobile device and related infrastructure can be modified to take advantage of the benefits and functionality of the system and method of the invention.

14 Claims, 6 Drawing Sheets

Related U.S. Application Data

No. 14/224,509, filed on Mar. 25, 2014, now Pat. No. 9,253,612, which is a continuation of application No. 11/845,633, filed on Aug. 27, 2007, now Pat. No. 8,712,450.

(51) Int. Cl.
*H04W 4/14* (2009.01)
*H04M 3/42* (2006.01)
*H04W 4/20* (2018.01)

(56) References Cited

U.S. PATENT DOCUMENTS

| | | | |
|---|---|---|---|
| 6,823,060 B1 | 11/2004 | Adams et al. | |
| 6,891,811 B1 | 5/2005 | Smith et al. | |
| 7,155,520 B2 | 12/2006 | Matsumoto | |
| 7,159,123 B1 | 1/2007 | Frantz | |
| 7,209,950 B2 | 4/2007 | Bennett et al. | |
| 7,215,946 B1 | 5/2007 | Cardina et al. | |
| 7,409,428 B1 | 8/2008 | Brabec et al. | |
| 2002/0112014 A1* | 8/2002 | Bennett | H04W 88/184 709/206 |
| 2002/0123359 A1* | 9/2002 | Wei | H04L 29/06 455/466 |
| 2002/0147724 A1* | 10/2002 | Fries | G06F 17/30864 |
| 2002/0193996 A1 | 12/2002 | Squibbs et al. | |
| 2003/0026289 A1 | 2/2003 | Mukherjee et al. | |
| 2003/0083078 A1* | 5/2003 | Allison | H04L 12/585 455/466 |
| 2003/0229534 A1 | 12/2003 | Frangione et al. | |
| 2003/0231207 A1 | 12/2003 | Huang | |
| 2004/0052247 A1 | 3/2004 | Stahl et al. | |
| 2004/0095889 A1 | 5/2004 | Chang et al. | |
| 2004/0180678 A1 | 9/2004 | Smith et al. | |
| 2004/0196866 A1 | 10/2004 | Park et al. | |
| 2004/0215472 A1 | 10/2004 | Gleckman | |
| 2004/0258215 A1 | 12/2004 | DeVito et al. | |
| 2005/0003838 A1 | 1/2005 | Mccann et al. | |
| 2005/0086295 A1 | 4/2005 | Cunningham et al. | |
| 2005/0108417 A1 | 5/2005 | Haumont | |
| 2005/0114470 A1 | 5/2005 | Bal | |
| 2005/0148329 A1* | 7/2005 | Brunet | H04W 8/245 455/432.2 |
| 2006/0031523 A1 | 2/2006 | Morris | |
| 2006/0056419 A1 | 3/2006 | Eichler et al. | |
| 2006/0079255 A1 | 4/2006 | Bantukul et al. | |
| 2006/0111131 A1 | 5/2006 | Shin et al. | |
| 2006/0235992 A1 | 10/2006 | Matias et al. | |
| 2006/0280165 A1 | 12/2006 | Blumenschein et al. | |
| 2007/0008955 A1 | 1/2007 | Delaney et al. | |
| 2007/0275739 A1 | 11/2007 | Blackburn | |

\* cited by examiner

SYSTEM AND METHOD OF CREATING AND PROVIDING SMS HTTP TAGGING

FIELD OF THE INVENTION

The invention generally relates to a system and method for sending text messages and, more particularly, the invention relates to a system and method for forcing SMS capable devices to communicate via SMS using, for example, SS7 protocol.

BACKGROUND OF THE INVENTION

Technology is ubiquitous in modern life, often taking the place of human interaction. For example, computing networks such as text messaging, email, blogs, etc. have begun to supplant face to face interactions between people. Often this has the advantage of increasing productivity and efficiency.

One type of technology is Short Message Service (SMS), which is a service available on mobile telephones and other mobile devices that permits the sending of short messages, e.g., text messaging. The term text messaging and its variants are commonly used to describe SMS. Text messages are also used to interact with automated systems, such as ordering products and services or participating in contests or polls.

Transmission of the short messages can be performed through different protocols such as SS7 (Signaling System #7) within the standard GSM MAP. SS7 is a set of telephony signaling protocols used by the telephone network to exchange information. That is, SS7 provides a universal structure for telephony network signaling, messaging, interfacing, network maintenance, establishment of a call, exchanging user information, call routing, billing structures, and supporting Intelligent network (IN) services, amongst other functions. SS7 messages can convey information such as:

"I am forwarding to a call placed from 202-555-5555 to 212-555-6666. Look for it on trunk 067 . . . . Release the call and play a busy tone. The route to XXX is congested. Do not send any messages unless they are a priority."

In practice, SMS messages are sent with a forward_short_message, whose payload length is limited by the constraints of the signaling protocol to precisely 140 bytes (140 bytes=140*8 bits=1120 bits). This translates to 160 7-bit characters, 140 8-bit characters, or 70 16-bit characters. However, larger messages can be segmented over multiple messages, in which case the receiving party is responsible for reassembling the message.

SMS is widely used for delivering digital content such as news alerts, financial information, logos and ringtones. Such messages are also known as premium-rated short messages (PSMS). The subscribers are charged extra for receiving this premium content, in addition to the charge for regular text messaging. Premium short messages are increasingly being used for services such as vending machines (i.e., for payment for items). In this case, payment is sent by a premium-rated short message and the cost of the item is added to the user's phone bill. In other implementations, Cingular®, for example, has implemented a SMS powered voting service for a popular television show. (Cingular is a trademark of Cingular in the United States, other countries, or both.) In this implementation, a message is sent to a user, perhaps via TCP/IP or SS7. The recipient can then view the message and vote for a particular contestant by sending a text message. This is accomplished by the recipient manually entering a telephone message with the text message to be sent.

However, with SMS, as noted above, in any type of application, the user must text a message to a certain number, but this interaction is error prone. It relies on the user to properly enter the SMS message, telephone number, etc. and send it to the correct address. In addition, in an example of voting, the user may not remember all the choices during the polling time, thus leading to an incorrect entry.

Accordingly, there exists a need in the art to overcome the deficiencies and limitations described hereinabove.

SUMMARY OF THE INVENTION

In a first aspect of the invention, a method comprises providing a tag forcing a return text message to be sent via SS7 protocol.

In another aspect of the invention, a system for deploying an application in a computing environment comprises a computer infrastructure operable to provide an xml or html tag having information forcing a response to be sent via a telephony protocol.

In another aspect of the invention, a computer program product comprising a computer usable medium having readable program code embodied in the medium is provided. The computer program product includes at least one component to perform the steps of the invention. For example, the computer program product includes at least one component to provide a message to a recipient which links a tag having coding forcing a return text message to be sent over telephony.

In another aspect, a method for deploying an application in a computing environment, comprising a computer infrastructure is operable to force a return text message to be sent over telephony.

DETAILED DESCRIPTION OF EMBODIMENTS OF THE INVENTION

The invention generally relates to a system and method for sending text messages and, more particularly, the invention relates to a system and method for forcing SMS capable devices to communicate via SMS using, for example, SS7 protocol. In use, the system and method of the invention is configured to force the use of SMS messages via the SS7 protocol. As should be known to those of skill in the art, SS7 bandwidth is a low usage bandwidth. The system and method of the invention can be implemented over any network, for example, and any existing mobile device and related infrastructure can be modified to take advantage of the benefits and functionality of the system and method of the invention.

In implementation, the system and method of the invention uses an SMS tag in html to allow the user to send SMS messages on a SS7 capable device and receive binary SMS messages that are both SMS and http capable. The advantage of the SMS capable html is the ability to send messages to an SMS queue. This allows for a User Datagram Protocol (UDP) type message or MQ type message, where the telephone does not wait for a response from the service. In embodiments, the use of an SMS tag inside of html forces the SMS capable devices to communicate via SMS. This can be applicable over a wide variety of applications including, for example, voting, polling, and in use with premium-rated short messages.

IBM WebSphere® MQ delivers reliable application integration for applications and Web services, allowing the user to fully leverage existing software and hardware investments. WebSphere MQ provides a messaging backbone for deploying an enterprise service bus (ESB) as the connectivity layer of a service-orientated architecture (SOA). WebSphere MQ also increases flexibility and offers increased transparency, reliability and audit ability of data movement compared to file transfer protocol (FTP) based approaches. Moreover, WebSphere MQ supports both de facto interface MQI and industry standard JMS V1.1 interface, with integrated publish-and-subscribe support, in addition to supporting secure Internet communication with industry standard Secure Sockets Layer (SSL). (IBM and WebSphere are trademarks of IBM Corporation in the United States, other countries, or both.)

By way of a non-limiting illustrative example, an SMS address tag can be used inside an xml or html to force a message to be sent via SMS. For example, an SMS tag can be:

```
<sms href="sms://404.555.5555">Here is my sms
   link </sms>
```

The "href" tag informs the system it is a hyperlink and the "sms://" informs the system to use SS7 protocol on the device, the latter of which forces the message to be sent via SMS over SS7. In this example, the tag forces the system to dial "404.555.5555". From this example, several advantages can be realized including, amongst other advantages:

The correct sending number will always be used since the number is placed within the tag;

Additional revenue can be assured by the mobile provider or other third party since the SMS will always be pushed through the SS7 protocol; and Polling becomes more accurate since the contestant information can be provided directly to the recipient.

In further embodiments, the SMS address tag can include body information such as, for example, user information, user requests, voting information (e.g., "I vote for Matt as being the worst singer"). Additionally, the body information can include polling options, e.g., choose the best contestant "Matt", "Mark", "Jessica" or "Chris". In this latter situation, the user can select one of these contestants and send such selection back to the originator.

In still further implementations, an SMS message can be pushed to the user with the tagging information such that the recipient can respond automatically to the message without the need to enter any numbers. This is due to the coding in the message tag. In further implementations, an SMS message can be pushed to the user with a hyperlink, linking to a website via the web browser (i.e., using TCP/IP) on the mobile device. In this implementation, the user can link to the website and respond to a question, poll or send other messages via SS7 protocol, by having such response linked to the tag described above. For example, based on the coding of the tag, the response will be forced through SS7, bypassing TCP/IP. In further implementations, any website can be coded or linked to the coding (via a database, for example) to a particular selection such that sending a communication (e.g., polling, voting, etc.) will be forced through SS7, through the tagging described herein.

System Environment

Figure 1:
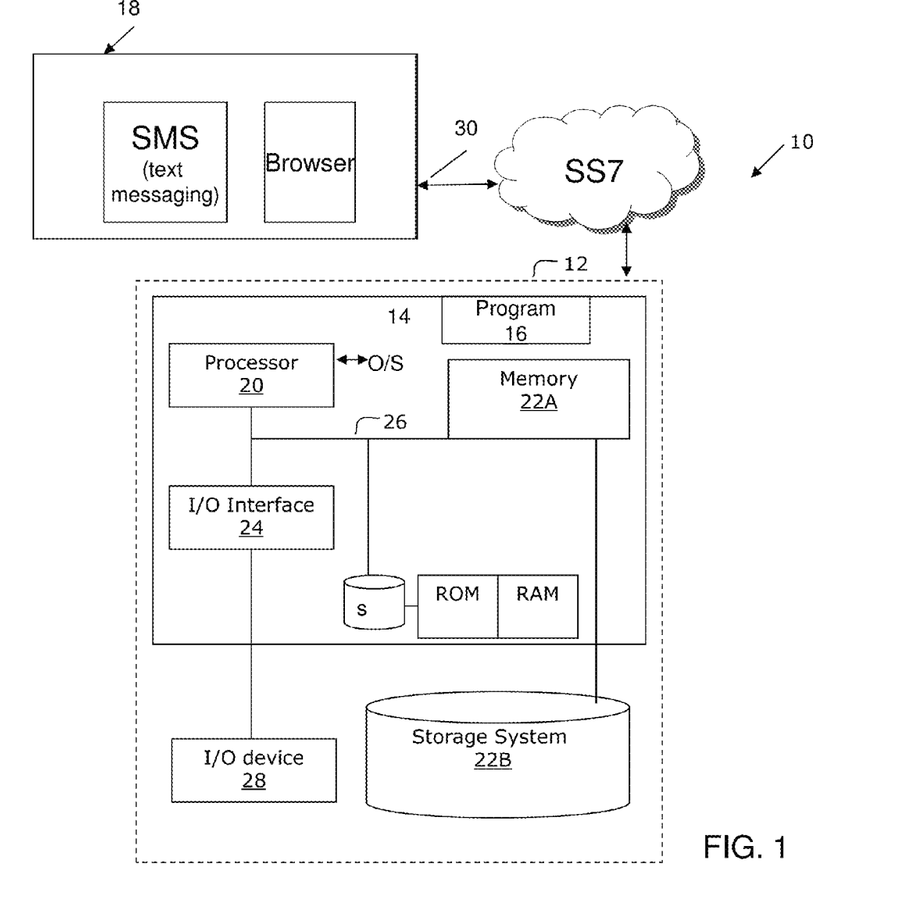
FIG. 1 shows an illustrative environment for implementing the steps in accordance with the invention.

FIG. 1 shows an illustrative environment 10 for managing the processes in accordance with the invention. The illustrative environment may be any computing device such as, for example, a server or workstation and may represent both a local system and a remote system implementing the processes of the invention. In one preferred embodiment, the illustrative environment is implemented with any mobile telephone or device 18 using any known operating system. The device 18 may also be a non-mobile device, in embodiments.

The environment includes computer infrastructure 12 having computing device 14. More specifically, computing device 14 includes program 16 which is configured and structured to, amongst other features, force messages to be sent via SMS. In implementation, this program may be resident on a sending computer, which would send a tag to a mobile device 18, capable of text messaging. The program can store computer code which includes the SMS tag such as, for example:

```
<sms href="sms://404.555.5555"?singer=Matt>Here
   is my sms link </sms>
```

This tag will be sent to the mobile device 18, forcing the mobile device to respond in SMS, using the telephone number "404.555.5555." In this manner, the return message will be sent over SS7 protocol to the sender or other designated number.

Additionally, in further embodiments, program 16 includes executable code, which may be stored temporarily or permanently in memory 22A. As should be understood by those of skill in the art, the executable code can be configured to implement the above functions.

In examples, the SMS tag is preferably sent via an SMS; however, it should be understood that the system and method of the invention works equal well when the recipient (mobile device) 18 is provided with a hyperlink (without the SMS tag), which directs the recipient 18 to a website. The website may be downloaded via a web browser on the device. The website may include certain "response" options, any of which are linked to the SMS tag of the invention. In embodiments, the website may be hard coded with the response and, in alternate embodiments, the website may obtain the SMS code via a link to an external database storing such tag and being associated with the response. In the latter example, the "webmaster" or administrator of the website can readily change the tagging information. Also, in these embodiments, the tag does not have to be sent to the recipient; instead, the tag is associated with a response.

Still referring to FIG. 1, memory 22A can include local memory employed during actual execution of program code, bulk storage, and cache memories which provide temporary storage of at least some program to reduce the number of times code must be retrieved from bulk storage during execution. Computer infrastructure 12 further includes a processor 20, input/output (I/O) interface 24, a bus 26, Storage "S", ROM, RAM and external I/O device/resource 28.

External I/O device/resource 28 may be a keyboard, display, pointing device, or any device that enables computer infrastructure 12 to communicate with one or more other computing devices using any type of communications link 30. Communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

Processor 20 executes the computer program code and logic of the system and method of the invention, which is stored in memory 22A. While executing the computer program code, etc., processor 20 can read and/or write data to/from memory 22A, storage system 22B, and/or I/O interface 24. Bus 26 provides a communications link between each of the components in computing device 14.

Flow Diagram Implementing Steps of the Invention

Figure 2A:
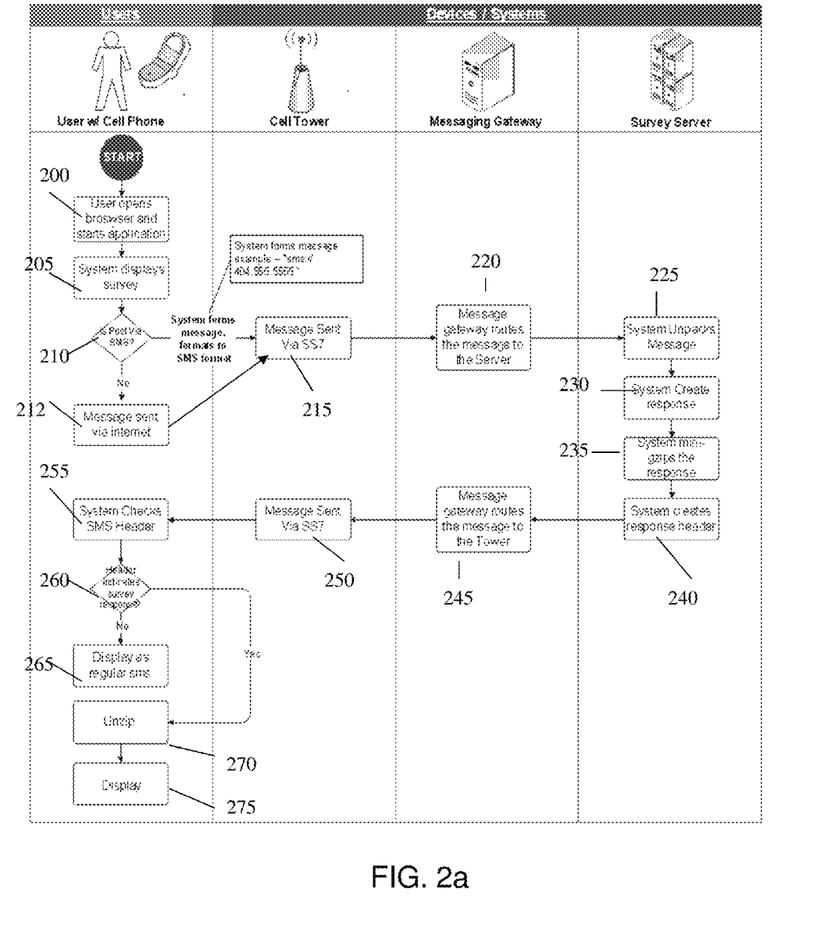
FIGS. 2a and 2b show diagrams implementing steps in accordance with the invention.
Figure 2B:
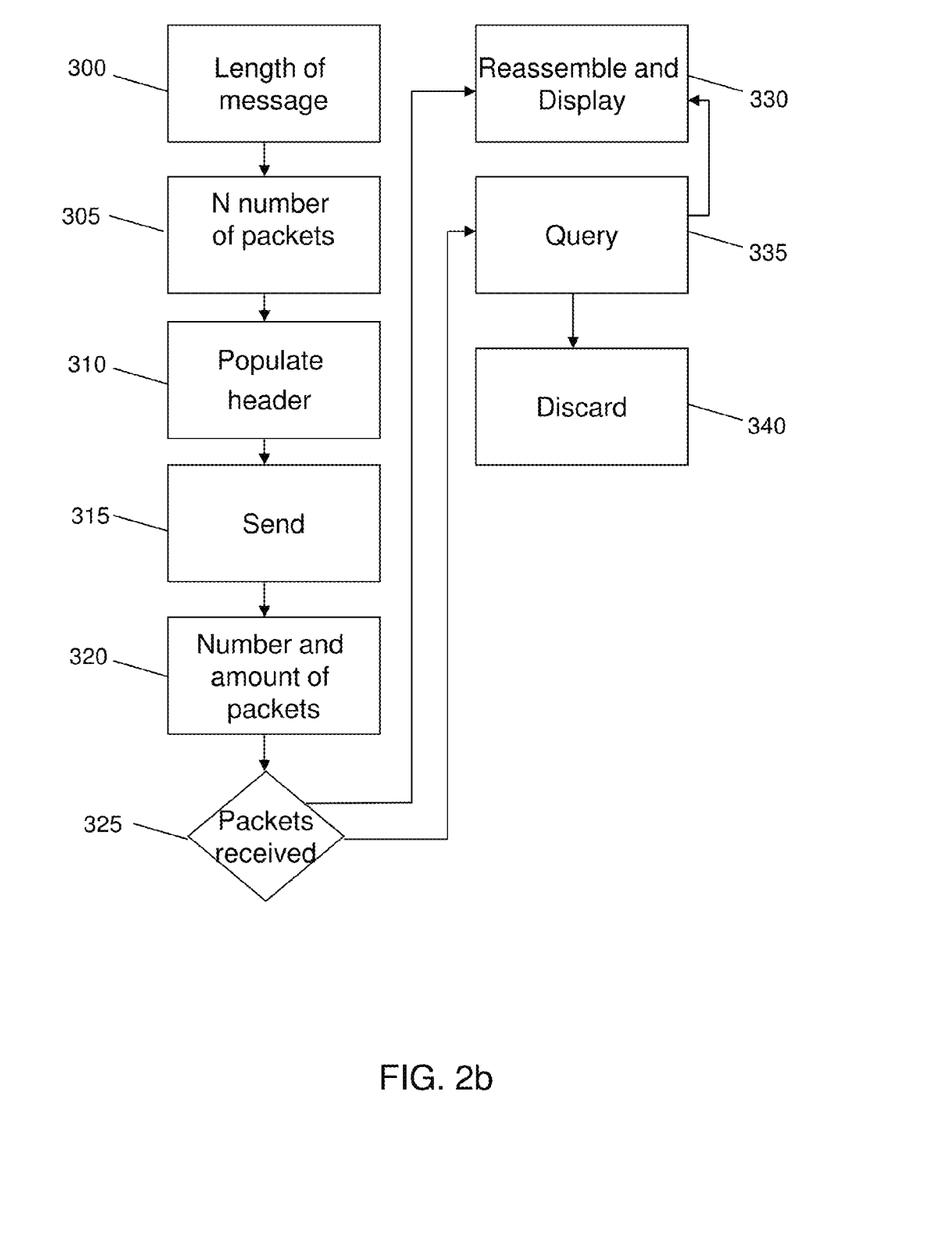

FIG. 2a represents a swim lane diagram implementing steps of various embodiments of the invention. FIG. 2b represents a flow diagram implementing steps in accordance with the invention. The steps of FIGS. 2a and 2b may be implemented in the environment of FIG. 1, using the graphical displays of FIGS. 3-7, and implemented, in practice using any type of mobile device which is configured to be compatible with SMS. The steps of the invention may equally represent a high-level block diagram of the invention.

The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In FIG. 2a, at step 200, a user opens the browser function of the device and starts the application. At step 205, the device displays a message or post which, in one example, may be a survey. The message includes the SMS tag, as discussed herein. At step 210, a determination is made as to whether the message is sent via SMS. If not, at step 212, the message is determined to be sent via the Internet, using TCP/IP. In this case, the device may open a website, via a web browser. The website may have certain responses which can be selected by the recipient, by way of "clicking". Each selection or a combination thereof may include the SMS tag information such that upon selection, the response will be an SMS response sent via SS7, at step 215 (an onwards as discussed below).

If the message is determined to be SMS, at step 215, the response is sent via SS7 using the number in the SMS tag. As discussed above, the received message (or any response) includes an SMS tag which forces any response to be sent SS7. This SMS tag may also include body information thus allowing the recipient to send a message such as, for example, a vote for a particular contestant, etc. along with the message. At step 220, the message gateway routes the message to a server (originating system, referred generally as "system"). At step 225, the system unpacks the message.

Steps 230 to 275 are optional steps. At step 230, the system creates a response and, in further embodiments, optionally compresses the text message response (step 235) using any known compression, such as mini-gzip. At step 240, the system creates a response header and sends the message to the recipient. The message can be sent to the recipient since the incoming message included "return information", via SS7. At step 245, the message gateway routes the message to the recipient, via the cell tower, for example. At step 250, the message is sent via SS7. At step 255, the recipient receives the message and checks the SMS header. At step 260, a decision is made as to whether the header indicates that the response is compressed. If not, at step 265, the message is displayed. If so, at step 270, the message is unzipped or uncompressed, and displayed at step 275. It should be understood that the response may be a hyperlink to a website, viewable via a web browser on the device.

In yet another alternative, much like the system side, the SMS message sent to the system may be compressed, depending on its length. By way of example, in the case of more than the maximum allowable characters, the mobile device (or system) may include compression software which compresses the text message into a more manageable size. In one embodiment, the device or system is configured to determine the size of the text message. When the text message is over a certain length, e.g., 225 characters, the compression software compresses the message into a mini zip file so that it can be sent in one package. The zip file can then be sent via SS7 and uncompressed on the receiving side, as discussed above.

In addition, FIG. 2b shows an example when the message is broken into separate parts due to its length. In this example, the header may include an identifier indicating that N number of packets is to be received from the sender. In each header of each packet, for example, a number may be provided indicating the number of the packet, in the sequence, e.g., N+1 of 30 of packets.

In the embodiment of FIG. 2b, at step 300, the process will determine the length of the message. At step 305, the process will create N number packets for the message, and segment the message into the N number packets. At step 310, the process will populate the header information of each N number of packets. The header information may include, for example, the packet number and the number of packets which will be sent. At step 315, the packets will be sent to the recipient. It should be understood by those of skill in the art that the packet formation may be performed by the mobile device, server or other computer infrastructure such as that of a service provider for a fee.

At step 320, the recipient will receive the packets and open the header to determine the number of the sent packet(s) and the number of packets which are to be received. At step 325, the process will determine which packets have not been received. Step 325 may be iterative in that this step may be repeated any number of times during the receipt of the message. At step 330, if all of the packets are received, the recipient's device will reassemble the message for display. However, if all of the packets are not received, the process may query the sender or other device or infrastructure to determine the status of the packets, at step 335. After a predetermined amount of time or attempts to retrieve the undelivered packets, the system and method of the invention may discard the entire message if all of the packets have not yet been received, at step 340. This may be after a maximum amount of attempts to retrieve all of the packets. If all the packets are received, the message will be reassembled and displayed at step 330.

Exemplary Graphical Displays

FIG. 3-7 show exemplary graphical displays of an application using the system and method of the invention. The exemplary graphical displays of FIGS. 3-7 are representative of a polling scenario of a popular television show. It should be understood, though, that the graphical user displays can be used in other applications in accordance with the invention.

Figure 3:
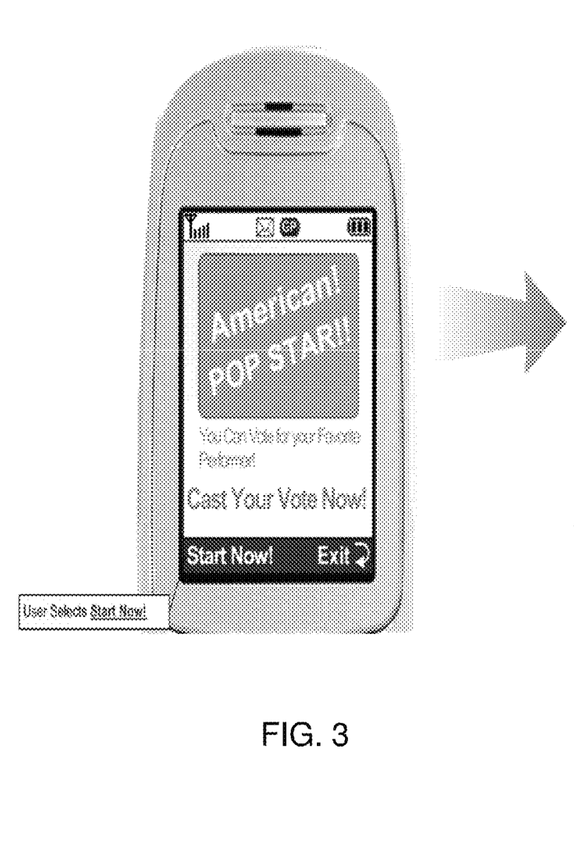
FIGS. 3-7 show various exemplary graphical user displays representative of an SMS based messaging system in accordance with aspects of the invention.

More particularly, FIG. 3 shows a graphical user display on a portable device in which the user accesses an SMS survey. In this example, an SMS message may have been sent to the device, with a hyperlink to a website. The web browser of the mobile device is shown displaying a website associated with the hyperlink. In an alternative method, the sender can send a website via TCP/IP. In this graphical user display, the user can select "Start Now!" option from the application menu to be taken to the survey screen of FIG. 4.

Figure 4:
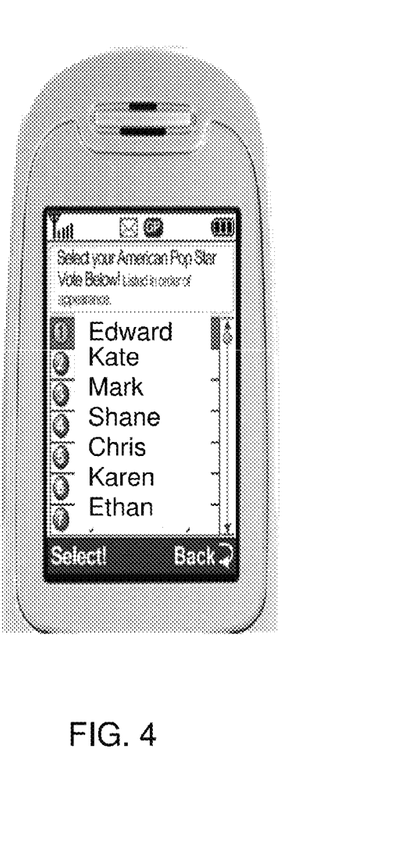

In FIG. 4, several selections are shown. In this graphical user display, the user is prompted to vote for a favorite performer. By default, the first selection is highlighted. The user may scroll the list using any known mechanism. In the example of FIG. 4, each selection has an SMS tag associated therewith so that, upon a selection, an SMS message is sent to the originating system, which includes the name of the selected contestant.

Figure 5:
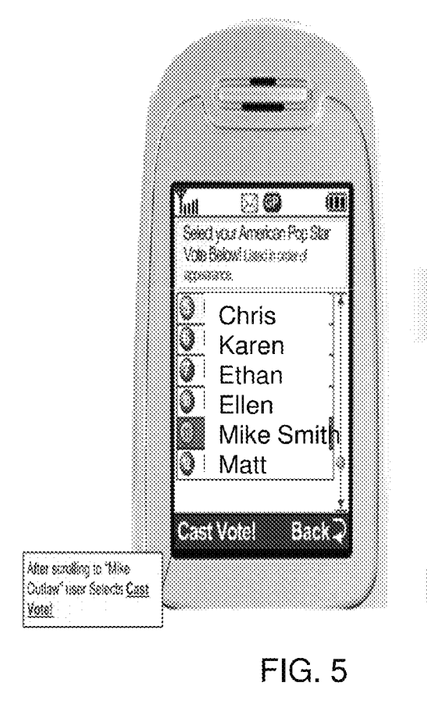
Figure 6:
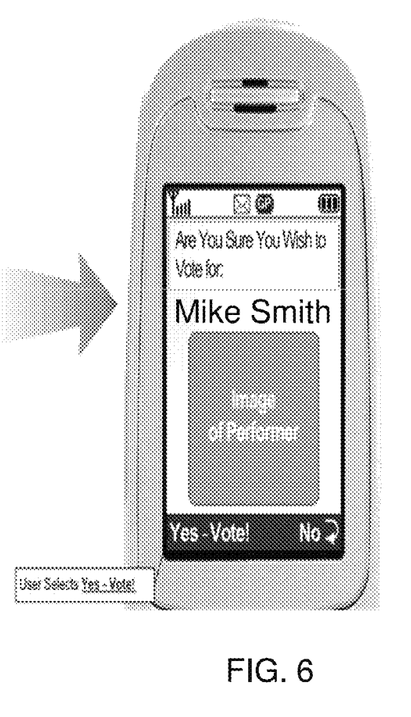

In FIG. 5, the user has scrolled to the desired selection, e.g., "Mike Smith". The user can then select the "Cast Vote!" option from the application menu. In embodiments, the user is then brought to a confirmation page as shown in FIG. 6. In embodiments, the graphical user display can include a message such as, "Are you sure you wish to vote for Mike Smith". In any scenario, the coding of this graphical user display can be, for example, "Are you sure you wish to vote for <selected contestant>". The user may then select the "Yes-Vote" selection or, alternatively, may return to a previous screen to change the selection.

Figure 7:
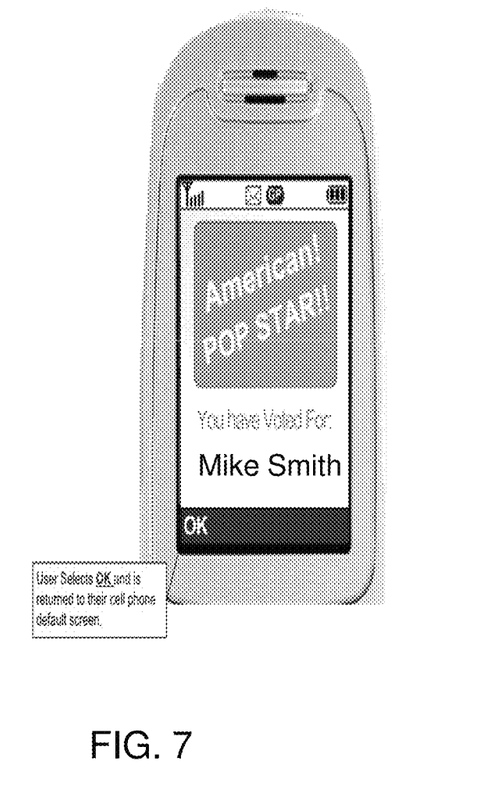

In the case of the "Yes-Vote", the display of FIG. 7 shows a success message and confirms that the message was sent. In the invention, since the selection included the SMS tag, the selection was automatically sent to a desired number via SMS over SS7 protocol. The user may select the "OK" selection to return to the default screen of the device.

As should be recognized, the graphical user interfaces may be a website, but can equally be a text message having the SMS tag. For example, the graphical display of FIG. 3 may be a display of a message or post which, in one example, may be a survey. The message may include the SMS tag, may include a hyperlink forwarding the user to a website, or may be a website which is provided to the device via TCP/IP. The displays of FIGS. 4-6 may be websites, working over TCP/IP. However, the graphical display of FIG. 5, for example, includes SMS tags associated with each of the contestants such that upon selection of a contestant, the vote (response) will automatically be sent to a recipient using the coding within the SMS tag, i.e., telephone number, calling information from the sender, selection, etc. The SMS tag thus forces the response to be sent via SMS over SS7, regardless of whether the user is on a website which is received via TCP/IP or an SMS message. In an optional step, as shown in FIG. 7, the user may receive a message, in return, indicating that the vote (or other message) was received.

While the invention has been described in terms of embodiments, those skilled in the art will recognize that the invention can be practiced with modifications and in the spirit and scope of the appended claims.

What is claimed is:

1. A method implemented in a computer infrastructure having computer executable code stored on a computer readable hardware storage device, the program code executing by a processor to:
   determine whether a message on a device was sent via SMS, the message including an SMS tag which comprises at least one selection option for a survey; and
   send a response message which is responsive to the message by indicating that the at least one selection option has been selected for the survey via an SS7 protocol when the message is determined to be sent via SMS,
   wherein each response of the survey includes a different SMS tag configured to force a return message which indicates that a response on a website has been selected for the survey to be sent via the SS7 protocol to a different number than remaining responses,
   the program code is further operable to receive a confirmation from a different number than the at least one selection option which has been selected for the survey,
   the survey is a graphical user interface on the device, and the device is a mobile device, and
   the graphical user interface comprises a text message on the device with each response of the survey including the different SMS tag.

2. The method of claim 1, wherein the program code is further operable to determine the message to have been sent via the Internet when the message is determined to not have been sent via SMS.

3. The method of claim 2, wherein the program code is further operable to open the website on the device via a browser function, the website comprising responses that are selectable by the user for the survey when the message is determined to have been sent via the Internet.

4. The method of claim 3, wherein the return message is indicative of the response selected by the user.

5. The method of claim 1, wherein the program code is further operable to:
   receive the message at the device; and
   check an SMS header of the message to determine whether the message is compressed.

6. The method of claim 5, wherein the program code is further operable to unzip or uncompress the message and then display the message.

7. The method of claim 1, wherein the return message is indicative of the response selected by the user.

8. The method of claim 1, wherein the message further comprises one of an xml and html which comprises the SMS tag.

9. The method of claim 1, wherein program code is further operable to:
   determine a character size of the message; and
   compress the message in response to the message being greater than a predefined character length.

10. The method of claim 9, wherein the predefined character length is 225 characters.

11. The method of claim 1, wherein the response on the website is selected for the survey by clicking the response.

12. The method of claim 1, wherein the graphical user interface comprises a website on the device.

13. The method of claim 12, wherein a first selection of the survey is highlighted by default.

14. The method of claim 1, wherein a first selection of the survey is highlighted by default.

\* \* \* \* \*